Figure 4:
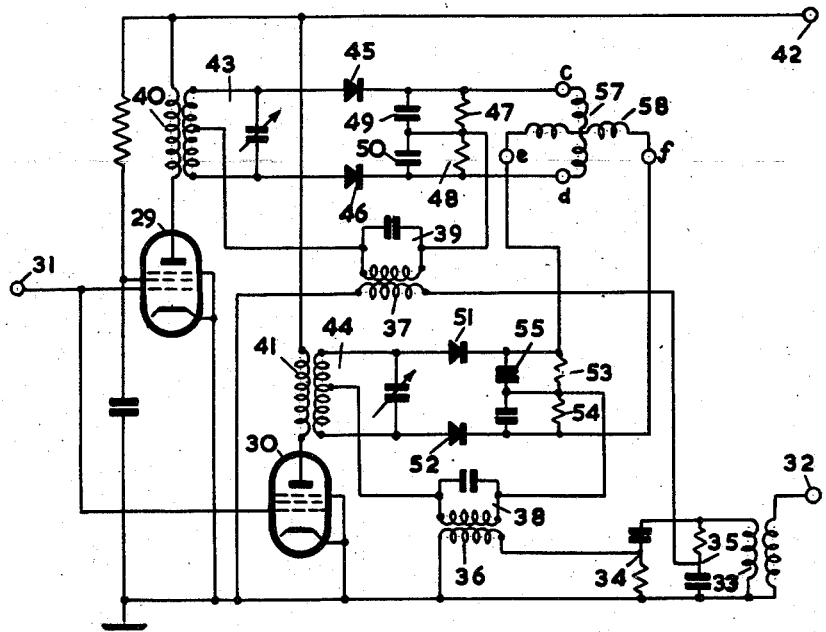

June 9, 1953      J. E. CLEGG      2,641,754
TERRAIN CLEARANCE INDICATOR
Filed Feb. 26, 1948      3 Sheets-Sheet 1
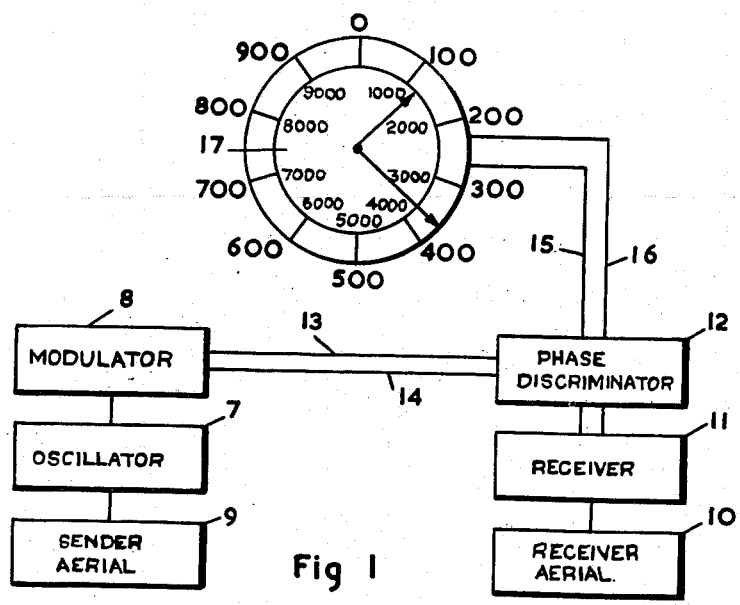
Fig 1
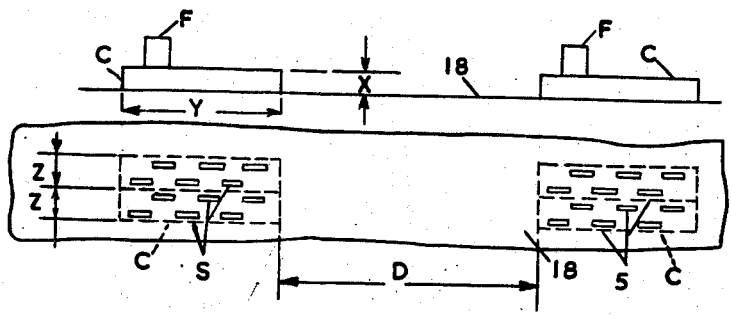
Fig. 2a.
Fig. 2b.
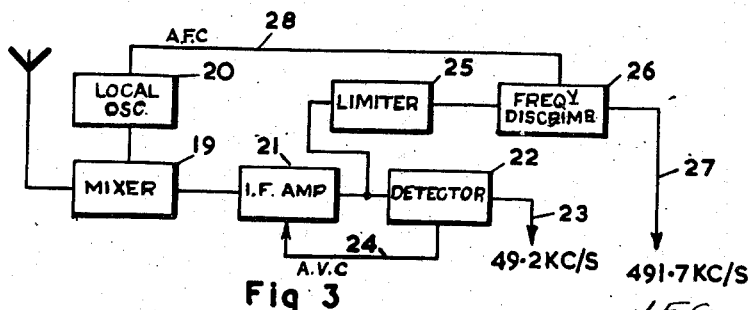
Fig 3
J. E. Clegg
Inventor
By   Nelson Moore
Attorney June 9, 1953  J. E. CLEGG  2,641,754
TERRAIN CLEARANCE INDICATOR
Filed Feb. 26, 1948  3 Sheets-Sheet 3

J. E. Clegg
Inventor
By Nelson Moore,
Attorney

Patented June 9, 1953

2,641,754

UNITED STATES PATENT OFFICE 2,641,754

TERRAIN CLEARANCE INDICATOR

John Ernest Clegg, Malvern, England, assignor to National Research Development Corporation, London, England, a British corporation Application February 26, 1948, Serial No. 11,068
In Great Britain April 12, 1946

11 Claims. (Cl. 343—12)

The present invention relates to radio apparatus for the measurement of distance, and is particularly but not exclusively concerned with radio altimeters.

Arrangements have already been proposed for indicating the actual height, or terrain clearance, of aircraft, such arrangements having marked advantages over barometric altimeters, which indicate height above an arbitrary level and require constant adjustment to take account of changes in the barometric pressure at the arbitrary level.

Terrain clearance indicators which make use of a radio wave reflected from the surface over which an aircraft is flying are known as radio altimeters. One known form of radio altimeter radiates a wave whose frequency is cyclically swept over a band, the receiving circuits being adapted to determine the height of the aircraft by comparing the frequency of the reflected wave with that of the wave being radiated at the same instant. In practice, the frequency of the radiated wave has to be swept over an uneconomically wide part of the frequency spectrum; such arrangements are not normally capable of measuring terrain clearance beyond a few thousand feet; and their accuracy is low, being some three per cent of the measured range in a typical example.

Another form of radio altimeter already proposed makes use of a frequency-modulated or phase-modulated transmitted wave, and height is measured by comparing the phase of the modulating oscillation with that of a beat oscillation derived from the reflected wave and the wave being radiated at the same instant. A limitation of such an arrangement is due to the fact that the beat oscillation is itself modulated in amplitude in such a manner that the beat oscillation varies in amplitude as the height increases, and may be of zero amplitude at heights within the range over which it is desired to measure; around such heights, there are blind regions within which no measurements are effective.

It is an object of the present invention to provide radio apparatus for the measurement of distance, such for example as the terrain clearance of an aircraft, which is free from the limitations of the known arrangements referred to above; a particular object is to provide apparatus capable of high accuracy up to ranges of the order of tens of thousands of feet.

According to the invention, there is provided radio measuring apparatus comprising a transmitter arranged to radiate a modulated radio-frequency wave, a receiver for waves reflected from objects whose distance from the apparatus is to be measured, means adapted continuously to compare the phase of a modulation-frequency component of reflected waves with the phase of modulating oscillations derived directly from the transmitter, display means for indicating the magnitude of the phase difference, and means for ensuring at the receiver a preponderance of reflected waves over waves arriving directly from the transmitter within a range of distances corresponding to a change of phase of said modulation-frequency component of at least a substantial fraction of 360°.

According to a feature of the invention, the radio-frequency wave radiated is modulated by two or more modulating oscillations of different frequencies, and a plurality of display means are provided each operating in dependence on the phase of a different modulation frequency.

The accuracy of measuring apparatus according to the invention depends on the constancy of the frequency of the modulating oscillations, and the desired accuracy is readily achieved by the use of stable sources such as crystal-controlled oscillators. Other features of the invention will appear from the following description and appended claims.

Figure 5:
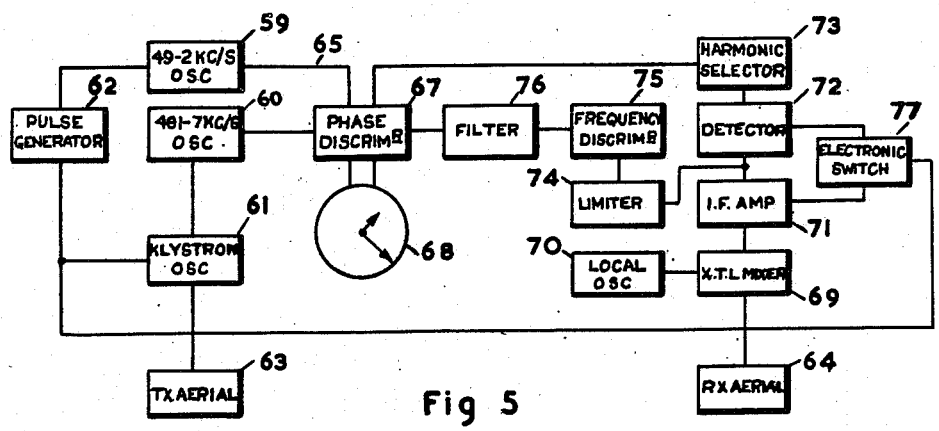
Figure 6:
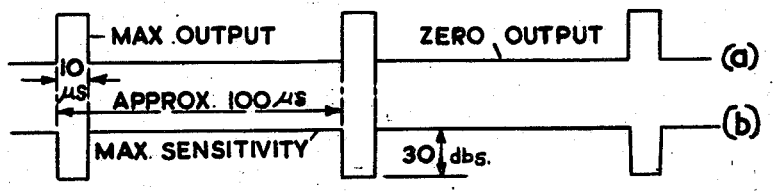

The invention will now be described in detail with reference to the accompanying diagrammatic drawings, in which Fig. 1 is a schematic diagram of one form of radio altimeter according to the invention, by way of example, Fig. 2 shows the construction of an aerial system suitable for the arrangement of Fig. 1, Fig. 3 shows schematically the nature of the receiver of the arrangement of Fig. 1, Fig. 4 is a circuit diagram of a form of phase-discriminating circuit suitable for use in the altimeter of Fig. 1, Fig. 5 illustrates a modified form of altimeter according to the invention, Fig. 6 is a waveform diagram illustrating the operation of the arrangement of Fig. 5, and Figures 7a, 7b, and 7c show the configuration of other aerial systems utilized in accordance with the invention.

Referring to Fig. 1, the transmitter 7 comprises a continuous-wave oscillator operating at a frequency of, say, 3000 mc./s. An oscillator power of the order of one watt is sufficient for operations up to several tens of thousands of feet with adequate signal-to-noise ratio.

By means of modulator 8, the oscillator is modulated by two oscillations of 491.7 kc./s. and 49.2 kc./s. respectively. The higher-frequency oscillation is preferably derived from a crystal-controlled oscillator of high stability; the other may be derived from the same or another similar source, but it may be derived quite satisfactorily from any suitable freely-running oscillator. Amplitude, frequency or pulse modulation may be employed. In one convenient arrangement, in which the oscillator is of the reflector klystron type, the higher-frequency modulation is applied to the reflector so as to frequency-modulate the oscillator, and the lower-frequency modulation is applied to the oscillator grid so as to effect amplitude modulation: a "square-wave" amplitude modulation has been found suitable.

The transmitting and receiving aerial systems are indicated schematically at 9 and 10 respectively: they are identical, and of a construction which is fully described below.

Aerial system 10 feeds a receiver 11, whose modulation-frequency output (at 491.7 and 49.2 kc./s.) is fed to a phase-discriminating device 12 constructed and arranged as described below. The device 12 is fed with reference oscillations at the two modulation frequencies from the modulator 8 over leads 13 and 14, and its function is to compare the phases of the reflected modulation-frequency signals with those of the reference oscillations. The device 12 furnishes two output currents which drive an indicating meter 17 over channels 15, 16. The two pointers of the meter (whose construction is described below) may conveniently read 0–1000 feet in 10 feet intervals (large hand) and thousands of feet up to 15,000 (small hand).

For a device according to the invention to operate satisfactorily, it is essential that the attenuation suffered by radio-frequency signals reaching the receiver by a direct path from the transmitter aerial system or otherwise than by reflection from the ground shall be large compared with the attenuation of signals received by reflection from the ground. Evidently, since the attenuation of signals taking the direct path is constant for a given pair of aerial systems, the requirement stated becomes increasingly difficult to meet as the maximum operating height is raised. However, with a carrier frequency of 3000 mc./s., and for an altimeter employing the modulation frequencies stated, adequate direct-path attenuation can be obtained by suitable aerial design up to heights corresponding to several complete cycles of 360° phase change by the higher-frequency modulating oscillation, and to at least a large fraction of 360° phase change by the lower-frequency modulation. An aerial arrangement which has been found suitable for the altimeter of Fig. 1 is shown in Fig. 2.

In Fig. 2(a), reference 18 indicates the metal skin of an aircraft, the two aerial systems being mounted conveniently in the belly of the fuselage, and spaced apart in the fore-and-aft direction. Fig. 2(b) is a view of the two aerial systems from below. Each aerial system comprises two aerials each constituted by six parallel slots (indicated by S) cut in the aircraft skin, and a rectangular metallic cavity resonator C, the resonators being mounted side by side inside the fuselage, one behind each group of six slots. Any known or suitable means for feeding energy to, or taking energy from the cavities may be employed, and the feeders are indicated schematically by F. The cavity dimensions X, Y and Z may be 2.7 cms., 40 cms. and 7.5 cms. The slots are so dimensioned and spaced that each aerial system has a polar diagram about 15 degrees wide in the pitch plane, and about 60 degrees wide in the roll plane, allowing for operation in a band up to 30 degrees, or a dive or climb up to 7.5 degrees.

The two-aerial systems are spaced apart by a distance D of about 2 metres, and with such an arrangement, an adequate preponderance of reflected signal to direct-path signal is had up to 6,000 feet or more on most times of aircraft. The dimension D may be increased in order to increase the direct-path attenuation, but only at the expense of departure from linearity of indication near the ground. For circumstances in which an aerial arrangement such as that described with reference to Fig. 2 is not satisfactory, the invention provides other arrangements, which are described below.

Reference is now directed to Fig. 3, which illustrates in more detail the receiver 11 of Fig. 1. In Fig. 3, 19 is a crystal mixer, and 20 is a klystron-type local oscillator, the mixer feeding at intermediate-frequency amplifier 21. The output from amplifier 21 is detected in an amplitude-modulation detector 22, which provides an output at 49.2 kc./s. at 23, and an automatic gain control voltage for amplifier 21 on lead 24. The output of amplifier 21 is also fed to a limiter 25 and thence to a frequency discriminator 26, from which an output at 491.7 kc./s. is taken at 27. The discriminator 26 also furnishes, over lead 28, an automatic frequency control voltage which controls the tuning of local oscillator 20 so as to correct the relative frequency drift between the transmitter and the local oscillator due to temperature variations and other factors.

The phase-discriminating device 12 (Fig. 1) comprises two similar circuits of the form illustrated in Fig. 4, one circuit being concerned with the received 491.7 kc./s. modulation and the corresponding reference oscillation, and the other with the two 49.2 kc./s. oscillations. It will be assumed that Fig. 4 shows the 491.7 kc./s. oscillations. It will be assumed that Fig. 4 shows the 491.7 kc./s circuit, and this frequency will be called the operating frequency.

Referring to Fig. 4, the two pentodes, 29, 30 have their control grids connected together to an input terminal 31 to which is connected lead 27 of Fig. 3. The reference oscillation is introduced at 32, and is applied from the secondary winding of transformer 33 across a network of two parallel circuits each comprising a resistance (R ohms) and a condenser ($X=R$ ohms) in series; point 34 in the network is earthed through winding 36, which is coupled to tuned circuit 38, and point 35 is earthed through winding 37 coupled to tuned circuit 39. The circuits 38, 39 are tuned to the operating frequency, and—as is well known to those versed in the art—the reference oscillations set up across them differ in phase by 90 degrees.

The anodes of pentodes 29, 30 are connected respectively through windings 40, 41 to a terminal 42 at a suitable positive potential, and windings 40, 41 are coupled respectively to circuits 43, 44 tuned to the operating frequency. The ends of circuit 43 are connected through rectifiers 45, 46 to complete a bridge circuit with resistances 47, 48 and condensers 49, 50 as shown. The bridge circuit is so arranged that the received modulation is introduced in antiphase into the adjacent rectifier arms, whereas the reference oscillation is applied across a diagonal, with the result that the output voltage at terminals c and d is a function of the angular phase difference of the applied oscillations.

Valve 30 feeds a similar bridge circuit comprising rectifiers 51, 52, resistances 53, 54 and condensers 55, 56; the output of this bridge circuit appears at terminals e and f. Terminals c and d, e and f are joined to a pair of conjugate coils 57, 58 forming part of indicator 17 (Fig. 1) and arranged to drive the larger hand through a complete rotation for each 360 degrees of change of phase of the modulating oscillation: this result is obtained because the currents in coils 57, 58 are proportioned to the sine and cosine respectively of the angular phase difference between the modulation and the applied reference oscillation, since the reference oscillations applied to the two bridges differ in phase by 90°.

Since the wavelength of the 491.7 kc./s. modulation is 2000 feet, it is clear that the larger hand of the indicator will go through a complete rotation (corresponding to 360° change of modulation phase) for each 1000 feet the aircraft gains or loses in height.

A similar circuit to that of Fig. 4 drives a similar pair of coils in the indicator 17 so as to move the smaller hand in accordance with changes in the phase of the received 49.2 kc./s. modulation (wavelength 20,000 feet); thus the smaller hand makes one complete revolution for every change of height of 10,000 feet.

It is intended in this embodiment, that the number of tens of thousands of feet should be determined by direct observation, or by reference to a barometric altimeter, but if desired a third modulation may be employed and provision made for recording tens of thousands by means of a third pointer.

As a safety measure, a tell-tale indicator is provided which operates when no signals, or unsatisfactory signals, are being received. Since, as has been explained, the receiver is provided with automatic gain control, it is conveniently arranged that the tell-tale indicator operates when the gain control voltage fails or falls below a predetermined level.

The aerial arrangement described with reference to Fig. 2 may not, on some types of aircraft, provide sufficient attenuation in the leakage path owing to re-radiation from fixed projections, such as communication and navigation aerials and undercarriages. Furthermore, it is desirable to have the aerial systems relatively close together, say about 2 metres spacing, so as to preserve the linearity of indication down to a height of 2 metres. Such close spacing may not be satisfactory for heights of greater than say 6,000 feet. These difficulties can be overcome, according to the invention, in several ways.

Figure 7A:
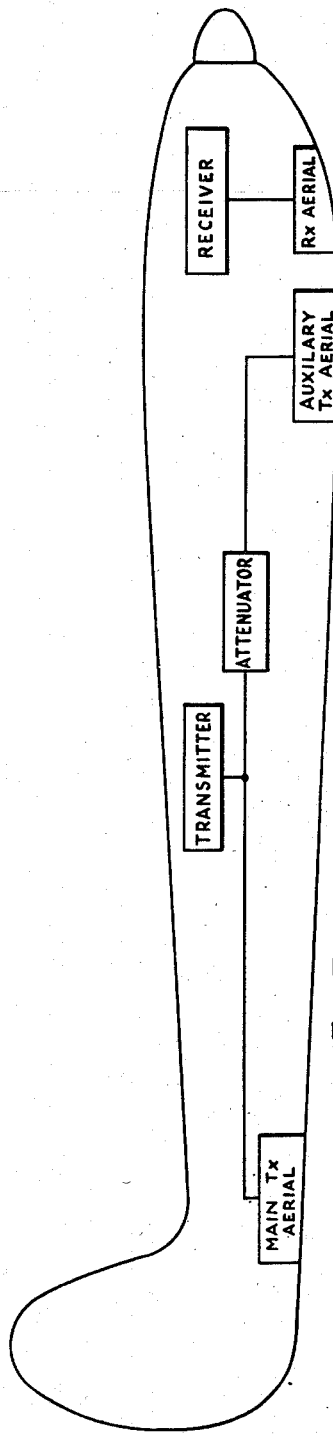
Figure 7B:
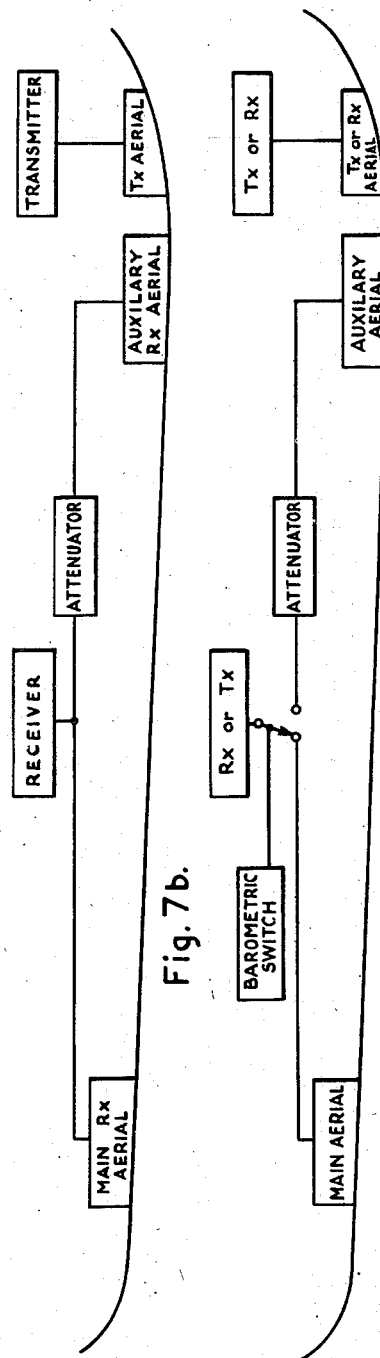

Firstly, as shown in Figure 7a a main transmitting aerial and an auxiliary transmitting aerial may be provided. The main aerial is spaced far from the receiving aerial; for example, the receiving aerial may be mounted at one end of the fuselage and the transmitting aerial at the other. The auxiliary transmitting aerial is placed close to the receiving aerial, say 1 metre separation or less, and a small percentage (say 1%) of the transmitter power is fed into the auxiliary aerial. The low power auxiliary aerial takes control when the aircraft is near the ground, and so gives a linear phase shift with changes in height close to the ground. The main aerial provides the signals at greater heights, but at all times gives rise to only a small leakage owing to its wide spacing from the receiving aerial. The auxiliary aerial, because it is only fed with small power, does not contribute substantially to the leakage signal. Alternatively, as shown in Figure 7b main and auxiliary receiving aerials are used with a single transmitting aerial. The auxiliary receiving aerial is arranged to pick up only about 1% of the available signal. The auxiliary aerials may in both cases be small single slot aerials, and the lengths of the feeders to the main and auxiliary aerials are made the same.

Figure 7C:
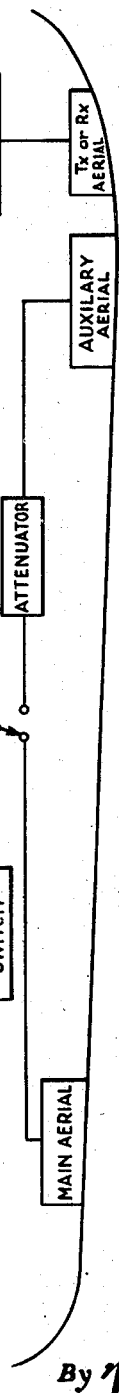

In the arrangements described in the last paragraph, the main and auxiliary aerials are permanently connected in parallel. The main and auxiliary aerials may, however, be switched into operation alternatively as shown in Figure 7c, the main or widely-spaced aerial being used at heights above say about 6,000 feet and the close-spaced aerial being used at lower heights.

The switching referred to above may be done manually, or automatically by a switch controlled by the barometric pressure in such a way as to bring into use the widely-spaced aerials when the aircraft height exceeds an intermediate height, say 6,000 feet.

If desired, there may be provided a press-button or like switch adapted when operated to feed substantially more than 1% of the transmitter power to an auxiliary transmitting aerial: when the switch is operated, the leakage signal prevails, and the indicator zero is automatically checked.

A further method of removing the effects of leakage signals above a chosen intermediate height will now be described with reference to Figs. 5 and 6.

It is evident that below some pre-determined intermediate height, the effects of a limited leakage signal will be negligible because of the high reflected field strength, and it has been found that a safe intermediate height may be taken at about 5,000 feet in most circumstances. It is therefore proposed to transmit signals during the first 10 microseconds only of each successive interval of approximately 100 microseconds, so that in conditions in which signals return from the ground 10 microseconds or more after the time of transmission (corresponding to aircraft heights of more than 4910 feet) they arrive at the receiver after the transmitter has become inoperative. Fig. 6(a) shows diagrammatically the cyclic operation of the transmitter, and Fig. 5 is a schematic diagram of an altimeter operating in the manner described.

Referring to Fig. 5, 59 and 60 are sources of 49.2 and 491.7 kc../s. modulating oscillations. Source 60 frequency modulates a klystron-type oscillator 61 on its reflector. Source 59 synchronises a pulse generator 62 which generates a positive-going pulse lasting for 10 microseconds at the beginning of each approximately 100 microsecond interval and this pulse is applied to the grid of oscillator 61 so as to allow the latter to oscillate only during the positive-going pulses. The transmitting and receiving aerial systems 63, 64 may be of the kind described with reference to Fig. 2; preferably, the arrangement is such that the reflected signal whilst the transmitter is operating is always greater than about ten times the leakage signal. Reference oscillations at 49.2 and 491.7 kc./s. are applied over leads 65, 66 respectively to a phase discriminating device 67 which feeds an indicator 68: device 67 and indicator 68 may be as described with reference to Figs. 1 and 4.

Alternatively, 62 may be a 9.84 kc./s. multivibrator generating a waveform a shown in Fig.

6(a), in which case 59 is a device for selecting and amplifying the fifth harmonic of the multi-vibrator output for use as the reference oscillation.

The receiver comprises a crystal mixer 69, local oscillator 70 and intermediate-frequency amplifier 71, the latter feeding an amplitude-modulation detector 72. The fifth harmonic of the de-detector output is selected and amplified at 73, and fed into discriminator 67: together with the reference oscillation fed in on lead 65, it controls the smaller hand of the indicator, which rotates once for each 10,000 feet change of height.

The output of amplifier 71 is limited in limiter 74 and applied to a frequency discriminator 75: the output of the latter is fed to a filter 76 tuned to 491.7 kc./s. and having a Q about 50, and the filter rings to give rise to a sensibly continuous 491.7 kc./s. signal. This latter signal is compared in phase, in discriminator 67, with the 491.7 kc./s. reference oscillation, and causes the larger hand of indicator 68 to make one revolution for each 360° phase change.

If desired, the 10 microsecond pulse which allows the transmitter to operate may be used also to desensitise the receiver and thus to prevent it receiving signals direct from the transmitter. It is not necessary nor desirable completely to suppress the receiver; a reduction in sensitivity by about 30 dbs is generally sufficient. Desensitisation is desirable when the reflected signal strength has fallen below a critical value equal to about ten times the leakage, and these conditions are found to obtain when the aircraft height exceeds some 5,000 feet. It is preferable not to desensitise the receiver when the aircraft is below 5,000 feet, for then the receiver sensitivity is reduced for part of the reflected signal. Accordingly, it is preferably arranged that the receiver sensitivity is controlled by the strength of the reflected signal.

In Fig. 5, 77 is an electronic switch controlled by the output of detector 72, and arranged to allow a 10 microsecond suppression pulse from generator 62 to reach the intermediate-frequency amplifier 71 and reduce its gain when the received, reflected signal strength falls below a critical value, and to remove the suppression when the critical value is exceeded. Fig. 6(b) illustrates the suppression pulse.

If desired, an auxiliary transmitting or receiving aerial may be provided in addition to the main aerial, as described above.

Although the invention has been particularly described as applied to radio altimeters, it will be evident to those versed in the art that apparatus closely similar to that described may be employed in other fields in which radio technique is employed for the measurement of distance.

I claim:
1. Radio distance-measuring apparatus comprising a transmitter having an aerial, arranged to radiate a modulated radio-frequency wave, a receiver having an aerial to receive waves reflected from objects whose distance from the apparatus is to be measured, means adapted continuously to compare the phase of a modulation-frequency component of reflected waves with the phase of modulating oscillations derived directly from the transmitter, display means for indicating the magnitude of the phase difference, said aerials being spaced apart and having a narrow beam of radiation in their direction of separation, the spacing being such that at the receiver aerial a preponderance of reflected waves over leakage waves arriving directly from the transmitter within a range of distance corresponding to a change of phase of said modulation-frequency component by at least a substantial fraction of 360°, said radio-frequency wave being modulated by at least two modulating oscillations of different frequencies, a plurality of display means operating in dependence on the phase of different modulation frequency, said radio-frequency wave being frequency modulated by one of said modulating oscillations and amplitude modulated by another.

2. Apparatus according to claim 1, wherein said transmitter feeds a main transmitting aerial system distant from an aerial system for said receiver, and, at a reduced power, an auxiliary transmitting aerial system less distant from the receiver aerial system.

3. A terrain clearance indicator comprising a transmitter having an aerial for radiating a modulated radio frequency wave, a receiver having an aerial for receiving waves reflected from objects whose distance from the apparatus is to be indicated, both said aerials having the characteristics of a narrow beam of radiation in their direction of separation and spaced from each other a distance such that a preponderance of reflected waves received over leakage waves received directly from the transmitter system is maintained within a range of distances corresponding to a change of phase of said modulation frequency component, means for continuously comparing the phase of a modulation frequency component of reflected waves with the phase of modulating oscillations derived directly from the transmitter, indicating means connected to said comparing means for indicating the magnitude of the phase difference, said receiver being closely coupled to the reflected field by the main receiving aerial system distant from an aerial system for said transmitter and being relatively loosely coupled to the reflected field by an auxiliary receiving aerial system less distant from the transmitting aerial system.

4. The combination set forth in claim 1, said receiver being closely coupled to the reflected field by the main receiving aerial system spaced from said transmitter and being relatively loosely coupled to the reflected field by an auxiliary receiving aerial system spaced a smaller distance from the transmitting aerial system.

5. A terrain clearance indicator comprising a transmitter having an aerial for radiating a modulated radio frequency wave, a receiver having an aerial for receiving waves reflected from objects whose distance from the apparatus is to be indicated, said transmitter aerial having a main aerial positioned relatively removed from the aerial system of said receiver and an auxiliary aerial positioned relatively close to said receiver aerial, means connected to said transmitter for supplying said auxiliary transmitter aerial with a small fraction of the power supplied to said main transmitter aerial, said receiver and transmitter aerials both having the characteristic of a narrow beam of radiation in their direction of separation and spaced from each other a distance such that a preponderance of reflected waves received over leakage waves received directly from the transmitter system is maintained within a range of distances corresponding to a change of phase of said modulation frequency component, means for continuously comparing the phase of a modulation frequency component of reflected waves with the phase of modulating oscillations derived directly from the transmitter, and indicating means connected to said comparing means for indicating the magnitude of the phase difference.

6. The combination set forth in claim 5, and switching means connected to said transmitter and said main and auxiliary transmitter aerials whereby said main and said auxiliary aerial systems may be switched into operation alternatively.

7. The combination set forth in claim 6, said switching means being set for automatic operation to replace the auxiliary aerial system with the main system above a predetermined distance to be measured.

8. The combination set forth in claim 7, suppression means connected to said receiver whereby said receiver is automatically desensitized for indicated distances in excess of a predetermined value.

9. The combination set forth in claim 8, said suppression means being set to operate below a critical value of reflected field strength.

10. A terrain clearance indicator comprising a transmitter having an aerial for radiating a modulated radio frequency wave, a receiver having an aerial for receiving waves reflected from objects whose distance from the apparatus is to be indicated, pulsing means coupled to said transmitter and causing said transmitter to operate, said pulsing means producing a train of pulses of relatively short duration, means responsive to the strength of reflected signal for controlling the duration of said pulses, comparison means for continuously comparing the phase of a modulation frequency component of reflected waves with the phase of modulating oscillations derived directly from the transmitter, and indicating means connected to said comparison means for indicating the magnitude of the phase difference.

11. The combination set forth in claim 10 including means coupling said train of pulses to said receiver, said receiver including means responsive to said pulses and desensitizing said receiver when said transmitter is caused to operate.

JOHN ERNEST CLEGG.

References Cited in the file of this patent

UNITED STATES PATENTS

| Number | Name | Date |
|---|---|---|
| 2,050,418 | Boerner | Aug. 11, 1936 |
| 2,147,810 | Alford | Feb. 21, 1939 |
| 2,151,323 | Hollmann | Mar. 21, 1939 |
| 2,248,727 | Strobel | July 8, 1941 |
| 2,259,982 | Alexanderson et al. | Oct. 21, 1941 |
| 2,405,239 | Seeley | Aug. 6, 1946 |
| 2,407,644 | Benioff | Sept. 17, 1946 |
| 2,412,631 | Rice | Dec. 17, 1946 |
| 2,418,538 | Yetter | Apr. 8, 1947 |
| 2,421,394 | Schelleng | June 3, 1947 |
| 2,423,644 | Evans | July 8, 1947 |
| 2,451,822 | Guanella | Oct. 19, 1948 |
| 2,470,787 | Nosker | May 24, 1949 |
| 2,522,367 | Guanella | Sept. 12, 1950 |
| 2,556,109 | Rust | June 5, 1951 |

FOREIGN PATENTS

| Number | Country | Date |
|---|---|---|
| 615,667 | Great Britain | Jan. 10, 1949 |